(12) United States Patent
Nagata

(10) Patent No.: US 8,345,140 B2
(45) Date of Patent: Jan. 1, 2013

(54) IMAGE CAPTURING APPARATUS AND METHOD OF CONTROLLING SAME

(75) Inventor: Toru Nagata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 12/269,307

(22) Filed: Nov. 12, 2008

(65) Prior Publication Data

US 2009/0128680 A1    May 21, 2009

(30) Foreign Application Priority Data

Nov. 16, 2007   (JP) ................................ 2007-298590

(51) Int. Cl.
*H04N 5/222*   (2006.01)

(52) U.S. Cl. .................... 348/333.03; 348/135; 348/140

(58) Field of Classification Search ................. 348/135, 348/140, 187, 333.01, 333.02, 333.03, 333.04, 348/346
See application file for complete search history.

(56) References Cited

U.S. PATENT DOCUMENTS

| | | | | |
|---|---|---|---|---|
| 4,011,571 A * | 3/1977 | Okuzawa | ....................... | 396/291 |
| 5,659,823 A * | 8/1997 | Mukai et al. | ................... | 396/291 |
| 6,246,837 B1 * | 6/2001 | Kageyama et al. | ........... | 396/287 |
| 6,766,050 B1 * | 7/2004 | Saikawa et al. | ............... | 382/162 |
| 7,079,188 B2 * | 7/2006 | Shiraishi et al. | .............. | 348/350 |
| 7,239,350 B2 * | 7/2007 | Ban | .......................... | 348/333.02 |
| 7,317,485 B1 * | 1/2008 | Miyake et al. | ........... | 348/333.02 |
| 7,321,393 B2 * | 1/2008 | Kim | ........................ | 348/333.03 |
| 7,480,083 B2 * | 1/2009 | Takahashi et al. | ............ | 358/474 |
| 7,570,282 B1 * | 8/2009 | Kaplinsky | ..................... | 348/188 |
| 7,683,963 B2 * | 3/2010 | Huang | .......................... | 348/348 |
| 7,782,385 B2 * | 8/2010 | Sasaki et al. | ............. | 348/333.02 |
| 2003/0169350 A1 * | 9/2003 | Wiezel et al. | ................. | 348/239 |
| 2006/0139669 A1 | 6/2006 | Takahashi | | |

FOREIGN PATENT DOCUMENTS

| | | |
|---|---|---|
| JP | 2003-244464 | 8/2003 |
| JP | 2006-186594 | 7/2006 |

* cited by examiner

*Primary Examiner* — Aung S Moe
*Assistant Examiner* — Chriss Yoder, III
(74) *Attorney, Agent, or Firm* — Fitzpatrick, Cella, Harper & Scinto

(57) ABSTRACT

An image capturing apparatus for capturing a chart having color patches of a plurality of colors using a taking lens and obtaining a color-patch signal for creating a color profile. In the apparatus, the type of chart is identified, after which the focal length of the taking lens is acquired. Then, based upon the focal length, object distance suited to the chart type is determined and the user is notified of the object distance.

7 Claims, 7 Drawing Sheets

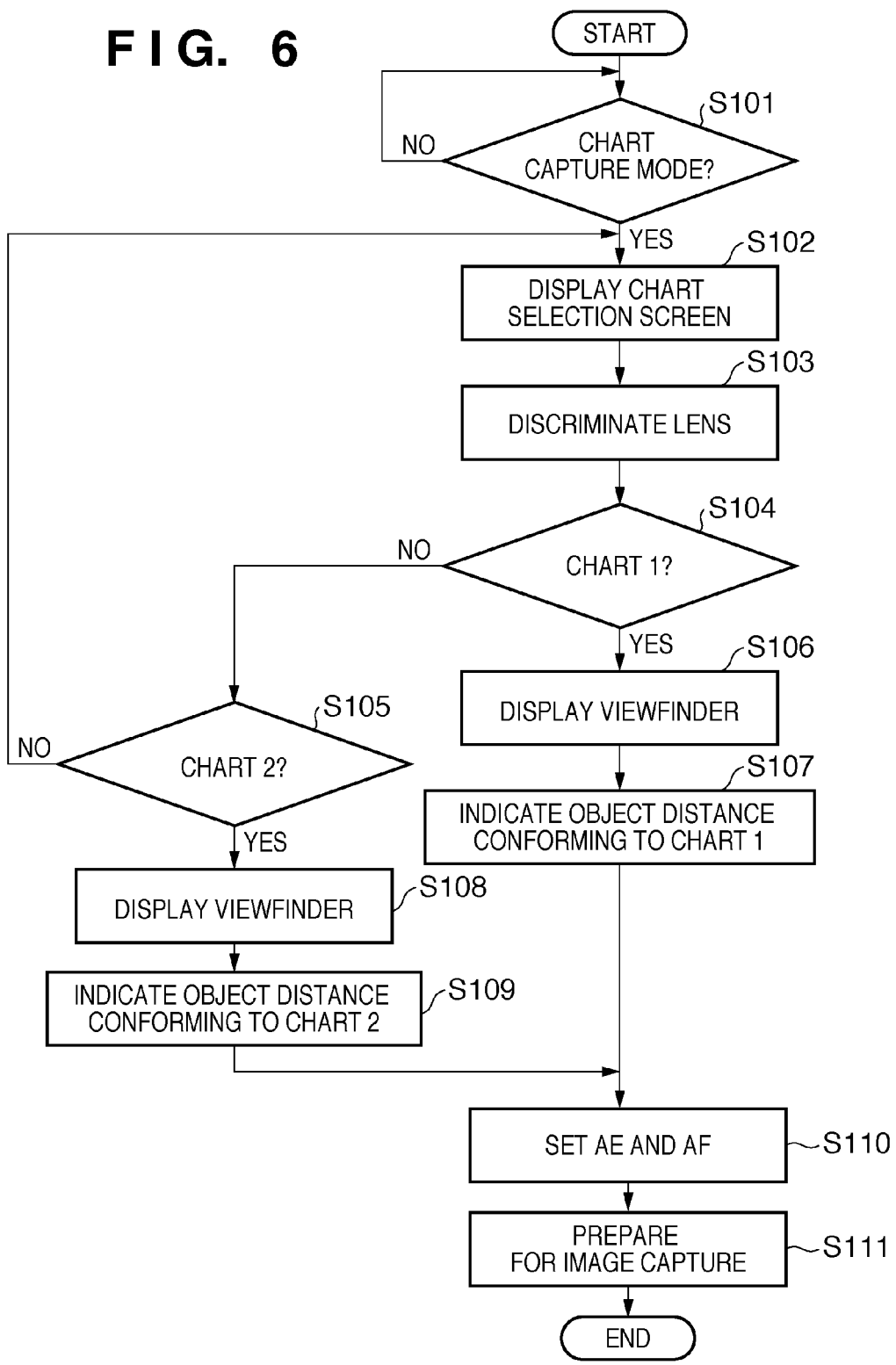

United States Patent
IMAGE CAPTURING APPARATUS AND METHOD OF CONTROLLING SAME

BACKGROUND OF THE INVENTION

1. Field of the Invention

The present invention relates to an image capturing apparatus and method of controlling the apparatus. More particularly, the present invention relates to an image capturing apparatus for capturing a chart having color patches of a plurality of colors and obtaining a color-patch signal for creating a color profile, and to a method of controlling this apparatus.

2. Description of the Related Art

In digital cameras now in general widespread use, color conversion processing is executed in such a manner that color reproduction of captured image data will result in an optimum color namely a color that is faithful to the color of the subject or a color that is desired by the observer, etc. The color of a subject, however, differs greatly depending upon the light source that illuminates the subject. Accordingly, even in case of color conversion processing that has been set up so as to obtain the optimum color reproduction under a certain light source, the optimum color reproduction will not necessarily be obtained if this processing is applied to image data that has been captured under a different light source.

In a digital camera, therefore, white balance control is carried out as processing preliminary to color conversion processing. However, R, G, B or other color information that is output by the sensor of the digital camera do not necessarily correspond to the tristimulus values perceived by a human being. This is ascribable to the fact that the spectral sensitivity of each pixel of R, G, B in the digital camera does not coincide with the color matching function. If the spectral sensitivity coincides with the color matching function, then, as long as an appropriate white balance is achieved, it will be possible to obtain optimum color reproduction by a single optimum color conversion processing operation under any light source whatsoever. In actuality, however, spectral sensitivity differs from the color matching function. Therefore, in order to execute highly accurate color conversion processing, it is necessary to execute color reproduction processing that difference depending upon the light source.

In order to execute color reproduction processing that differs in accordance with the light source, it is necessary to provide color profiles, such as look-up tables for performing color conversion, for respective light sources. A known method of creating such a color profile is to capture the image of a chart, which comprises a plurality of color patches, and create the color profile based upon the captured data of each color patch (e.g., see the specification of Japanese Patent Application Laid-Open No. 2003-244464). Another example of prior art for creating a color profile of a digital camera is to display a frame for capturing color at the time of photography (e.g., see the specification of Japanese Patent Application Laid-Open No. 2006-186594).

In the conventional methods of creating a color profile described above, it is assumed that the color patches have been captured accurately. That is, it is assumed that the chart to be captured has been captured under correct exposure conditions and at a correct focus under a prescribed shooting magnification. Accordingly, if the chart has not been captured accurately, the precision of the created color profile declines or creation itself becomes impossible.

However, performing chart capture is not easy for a user who has little experience in chart capture, and often a color profile is created from a badly captured image of the chart. Finally, resulted color profile has problem in its accuracy.

SUMMARY OF THE INVENTION

The present invention has been devised in order to solve these problems and seeks to provide an image capturing apparatus and method of controlling the same whereby it is possible to readily perform suitable chart capture the purpose of which is to create a color profile.

According to one aspect of the present invention, an image capturing apparatus for capturing a chart having color patches of a plurality of colors using a taking lens and obtaining a color-patch signal for creating a color profile is provided. In the apparatus, the type of chart is identified, after which the focal length of the photographing taking lens is acquired. Then, based upon the focal length, object distance suited to the chart type is determined and the user is notified of the object distance.

Further features of the present invention will become apparent from the following description of exemplary embodiments with reference to the attached drawings.

BRIEF DESCRIPTION OF THE DRAWINGS

FIG. 6 is a flowchart illustrating capture preparation processing at the time of the chart shooting mode in the embodiment.

DESCRIPTION OF THE EMBODIMENTS

Various exemplary embodiments, features and aspect of the present invention will be described in detail below with reference to the drawings.

<First Embodiment>

(Configuration of Apparatus)

Figure 1:
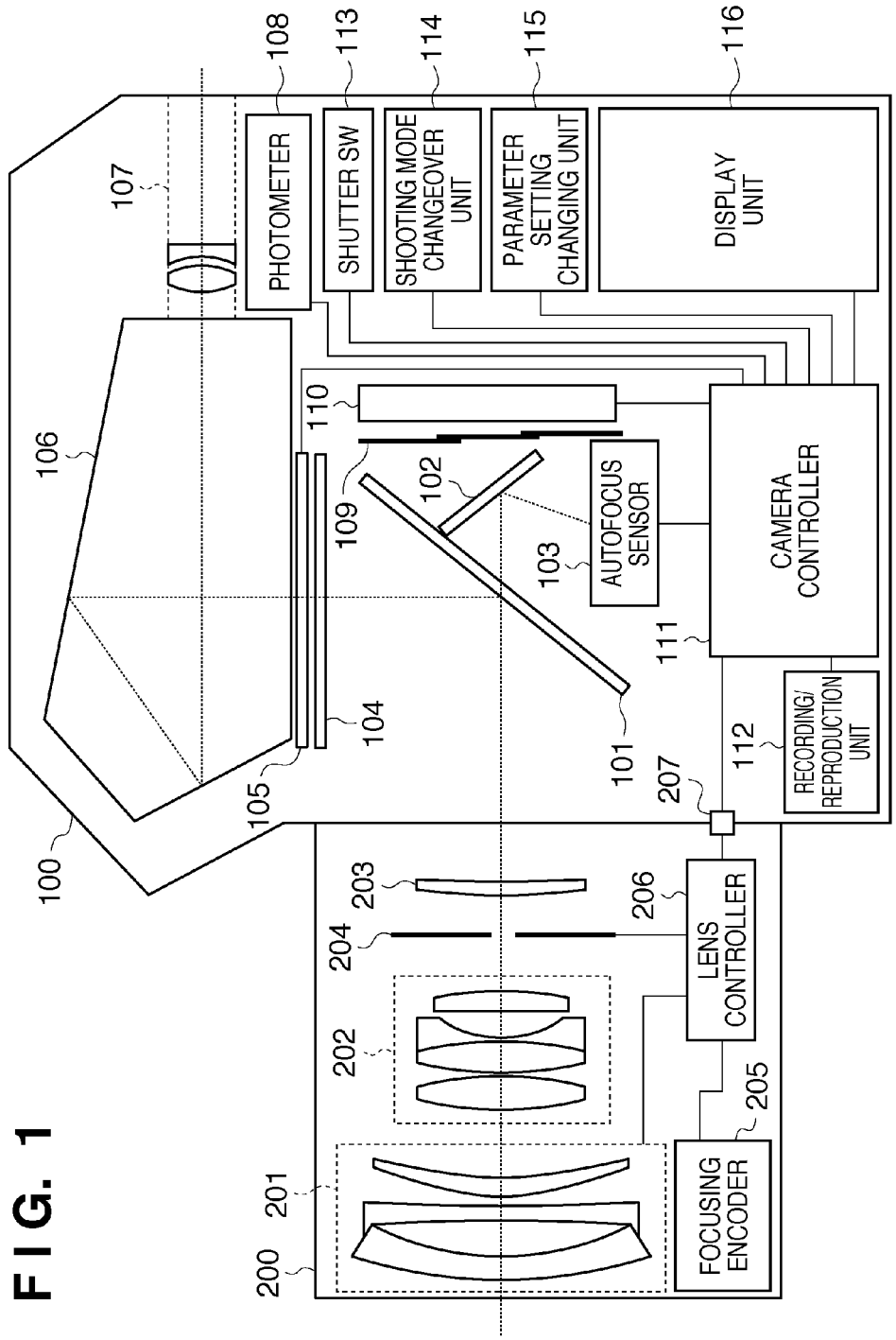
FIG. 1 is a block diagram illustrating the configuration of a digital single-lens reflex camera according to an embodiment of the present invention.

This embodiment illustrates an example in which a digital single-lens reflect camera is applied as an image capturing apparatus for capturing a chart having color patches of a plurality of colors and obtaining a color patch signal for creating a control profile. FIG. 1 is a block diagram illustrating the configuration of a digital single-lens reflex camera according to this embodiment. As shown in FIG. 1, the camera has a camera body 100 and an interchangeable lens unit 200.

The configuration of the interchangeable lens unit 200 will be described first. The interchangeable lens unit 200 has lens elements 201 to 203. The lens element 201 is a focusing lens group for adjusting the position of focus by being moved back and forth along the optical axis. The lens element 202 is a scaling lens group which, by being moved back and forth along the optical axis, changes the focal length of the lens unit 200. The lens element 203 is a fixed lens for improving lens performance such as telecentricity. The lens unit 200 has an aperture 204 and a focusing encoder 205, which reads the position of the focusing lens group 201 and generates a signal corresponding to subject distance. A lens controller 206 exercises control for changing the aperture diameter of the aperture 204 based upon a signal sent from the camera body 100 and moving the focusing lens group 201 based upon a signal sent from the focusing encoder 205. The lens controller 206 sends the camera body 100 lens information that includes the subject distance generated by the focusing encoder 205, the focal length that is based upon position information of the scaling lens group 202, and F-number that is based upon the aperture diameter of the aperture 204. A mount contact group 207 serves as a communication interface between the lens unit 200 and camera body 100.

The configuration of the camera body 100 will be described next. The camera body 100 includes a main mirror 101 that is tilted and placed in the shooting optical path when the viewfinder is being observed and is withdrawn from the optical path when a picture is shot. The main mirror 101 is a half-mirror which, when tilted in the shooting optical path, transmits approximately half of the light from the subject to an autofocus sensor 103, described later. A viewfinder screen 104 is placed in a predetermined image plane of the lens elements 201 to 203. The user checks the picture frame by observing the viewfinder screen 104 through an eyepiece 107. A pentagonal daha prism 106 changes the optical path for guiding the light from the viewfinder screen 104 to the eyepiece 107. A finder display element 105, which comprises a transmissive liquid crystal element, causes a frame of the kind shown in FIG. 4A and capture information such as shutter speed, aperture value and amount of exposure correction to be displayed on the screen which the user observes through the eyepiece 107. The details of the display frame shown in FIG. 4A will be described later.

The autofocus sensor 103 captures light flux from the lens unit 200 via a sub-mirror 102 retractably provided on the back side of the main mirror 101. The autofocus sensor 103 transmits the state of the captured light flux to a camera controller 111, which proceeds to judge the state of focus of the subject of the lens unit 200 based upon the state of the light flux. Then, based upon the judged state of focus and position information concerning the focusing lens group 201 sent from the lens controller 206, the camera controller 111 calculates the direction and amount of motion of the focusing lens group 201.

A photometer 108 generates brightness and luminance signals in a prescribed area of a picture that appears on the viewfinder screen 104 and transmits these signals to the camera controller 111. Based upon the signal values transmitted from the photometer 108, the camera controller 111 determines the appropriate amount of exposure to the image sensor 110.

Further, in accordance with a shooting mode selected by a shooting mode changeover unit 114, the camera controller 111 controls the aperture diameter of the aperture 204 so as to obtain the appropriate amount of exposure and controls the shutter speed of a shutter 109. If the shooting mode is a mode that gives priority to shutter speed, then the camera controller 111 calculates the aperture diameter of the aperture 204 so as to obtain the appropriate amount of exposure with respect to the shutter speed determined by a parameter setting changing unit 115. Based upon the calculated value, the camera controller 111 adjusts the aperture diameter of the aperture 204 by sending an instruction to the lens controller 206. Similarly, if the shooting mode is a mode that gives priority to the aperture, then the camera controller 111 calculates a shutter speed so as to obtain the appropriate amount of exposure with respect to the aperture value that has been set. Furthermore, if the mode is a program mode, then the camera controller 111 determines shutter speed and aperture value in accordance with a predetermined combination of shutter speed and aperture value with respect to the appropriate amount of exposure.

The above-described processing starts in response to pressing a shutter switch 113 half way. At this time the lens controller 206, using the direction and amount of motion of the focusing lens group 201 determined by the camera controller 111 as the targets, drives the focusing lens group 201 until the position information indicated by the focusing encoder 205 comes into agreement with a target amount of motion.

Next, by pressing the shutter switch 113 fully, a shooting sequence begins. In response to start of the shooting sequence, first the main mirror 101 and sub-mirror 102 are folded up and escapes from the shooting optical path. Next, the lens controller 206 narrows down the aperture 204 in accordance with the value calculated by the camera controller 111. Next, the shutter 109 is released and then closes in accordance with the shutter speed calculated by the camera controller 111. Thereafter, the aperture 204 is fully opened and then the main mirror 101 and subsidiary mirror 102 are restored to their original positions.

The image sensor 110 transfers the luminance signal of each pixel accumulated during release of the shutter 109 to the camera controller 111. Color filters comprising the three colors R, G, B are arranged on the image sensor 110 in the form of a Bayer array. The camera controller 111 forms a color image signal, which comprises the three channels of R, G, B, from the luminance signals corresponding to the positions of the R, G, B filters. In the case of the normal shooting mode, the camera controller 111 performs a color conversion using a color profile stored internally beforehand, performs mapping to a suitable color space and forms an image file having the appropriate format. The color profile utilized in this embodiment is created by, e.g., a personal computer based upon image information of a color chart pictured with the image capturing mode this embodiment describes. In the case of the chart capture mode, a file having the appropriate format is created without performing a color conversion and mapping to color space using a color profile.

A display unit 116 is provided on the back of the camera body 100. Based upon the settings made by the shooting mode changeover unit 114 and parameter setting changing unit 115, the display unit 116 displays the status of the settings and also displays a thumbnail image created by the camera controller 111 after capture.

A recording/reproduction unit 112 for a removable memory card records an image file, which has been created by the camera controller 111 after capture, on a loaded memory card.

Figure 2A:
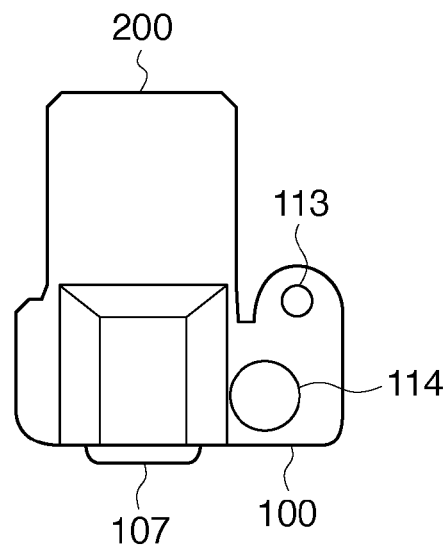
FIG. 2A is a top view of a digital single-lens reflex camera according to the embodiment.
Figure 2B:
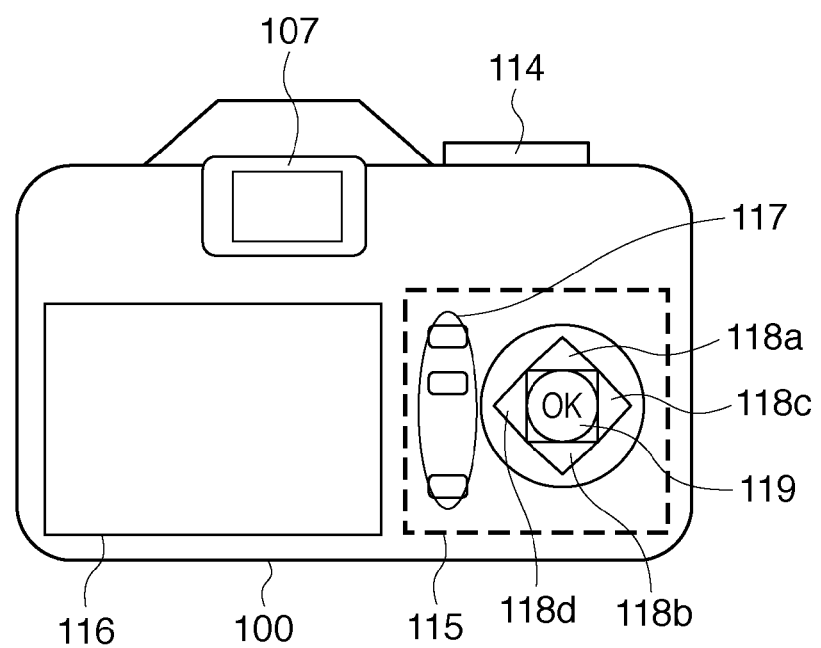
FIG. 2B is a back view of the digital single-lens reflex camera according to the embodiment.

FIGS. 2A and 2B are a top view and back view, respectively, of the digital single-lens reflex camera according to this embodiment. Components shown in FIG. 1 are designated by the same reference numbers in FIGS. 2A and 2B. They are the viewfinder eyepiece 107, shutter switch 113, shooting mode changeover unit 114, parameter setting changing unit 115 and display unit 116.

The parameter setting changing unit 115 has changeover buttons 117 for changing over the content of the display presented on the display unit 116. The parameter setting changing unit 115 further includes selection buttons 118a (up direction), 118b (down direction), 118c (right direction) and 118d (left direction) for moving a selection point up, down, left and right on the display unit 116. The parameter setting changing unit 115 also has an OK button 119 for deciding the selection.

Figure 3:
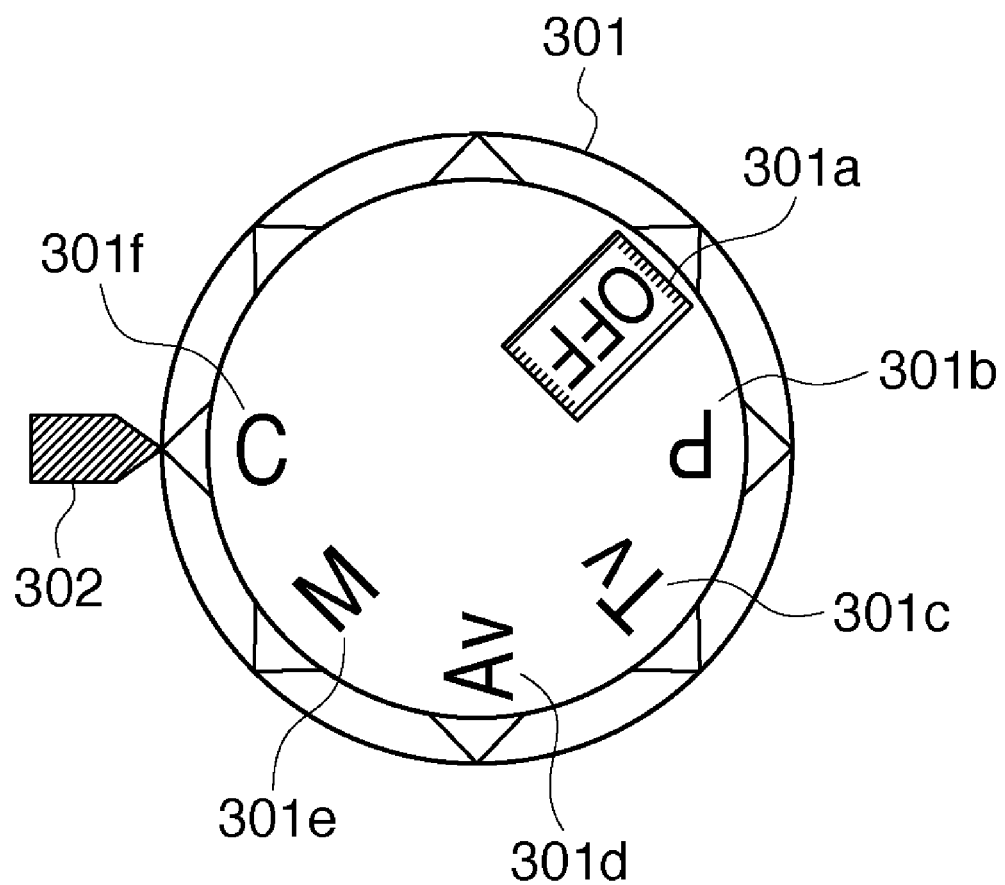
FIG. 3 is an external view of a shooting mode changeover dial according to the embodiment.

FIG. 3 is an external view of the shooting mode changeover unit 114. The shooting mode changeover unit 114 includes a mode setting dial 301 and a setting indicator 302 indicating the setting of the mode setting dial 301. Setting positions on the mode setting dial 301 are a position 301a for turning off camera power, a position 301b for program mode, a position 301c for shutter priority mode and a position 301d for aperture priority. The details of these shooting modes are as described earlier. A manual mode setting position 301e is for allowing the user to freely select the shutter speed and aperture, and a position 301f is for setting the chart capture mode.

(Viewfinder Display)

Figure 4A:
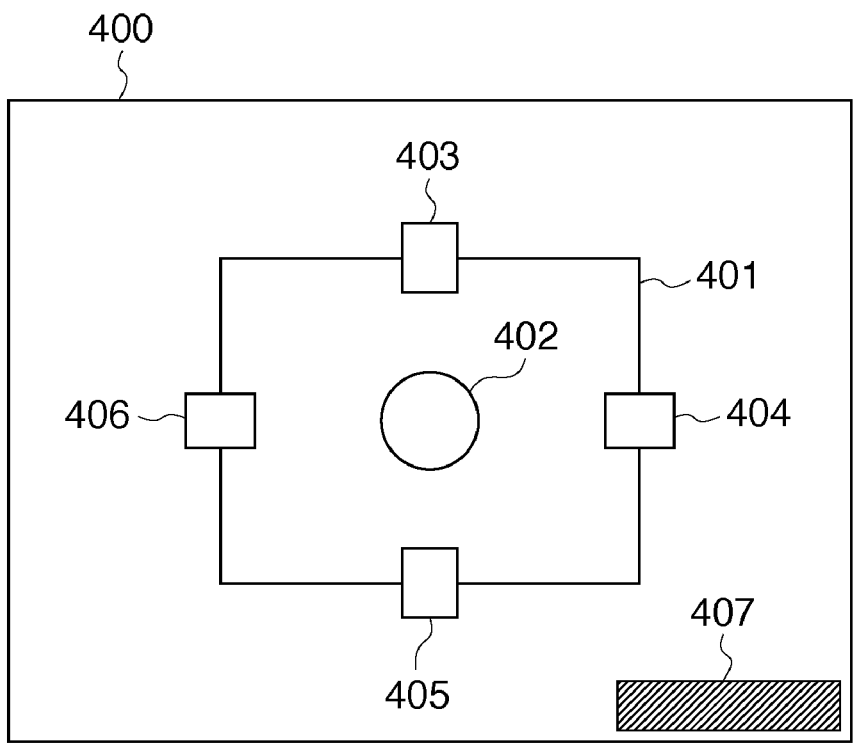
FIG. 4A is a diagram illustrating an example of a display on a viewfinder display element according to the embodiment.

FIG. 4A is a diagram illustrating a display presented in the viewfinder by the finder display element 105. Provided within a view finder frame 400 is a chart capture frame 401 displayed as a chart position indicator when the chart capture mode is selected. At the time of the chart capture mode, the user decides the angle of view in such a manner that a chart to be captured coincides with the chart capture frame 401. In order to avoid light falloff at the periphery of the lenses, it is desired that the shooting magnification of the chart be such that the chart will occupy about one-fourth of the area of the viewfinder field. However, this does not impose any particular limitation.

Reference numerals 402 to 406 denote autofocus indicators and 407 an object distance display section that indicates the optimum object distance at the time of the chart capture mode.

Figure 4B:
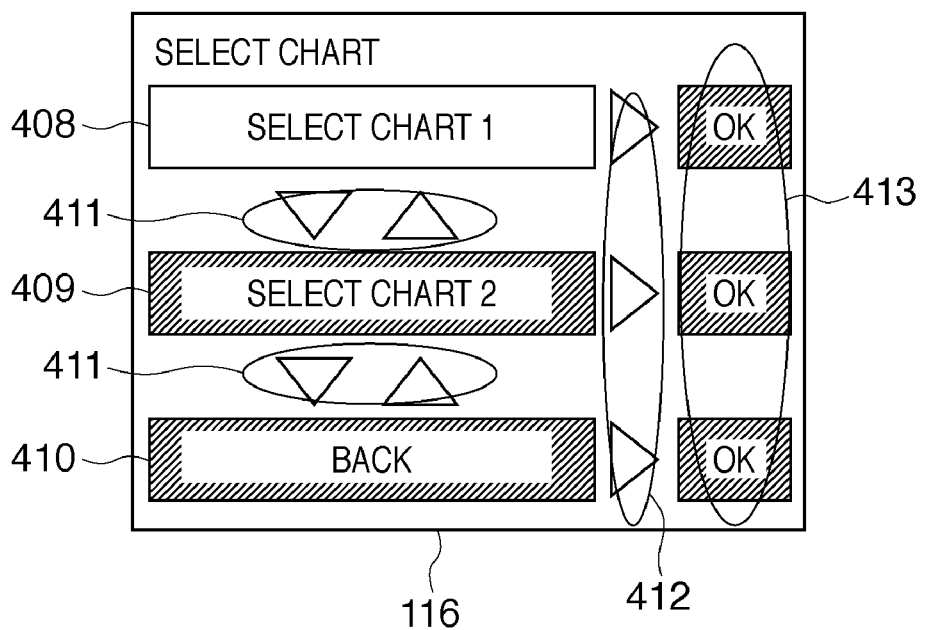
FIG. 4B is a diagram illustrating an example of a display on a display unit according to the embodiment.

FIG. 4B illustrates an example of a display presented in the display section 116 when the chart capture mode is selected. Chart 1 selection area 408 selects the fact that a chart to be captured is a predetermined "Chart 1". Likewise, next selection area 409 selects the fact that a chart to be captured is a predetermined "Chart 2". These selections are made by pressing the selection buttons 118a and 118b, respectively. Directions of movement between these are indicated by arrow displays 411, 412. The selected selection area is highlighted when displayed. FIG. 4B illustrates an example in which the Chart 1 selection area 408 has been selected. Another selection area 410 is for changing over the content of the display to the screen displayed immediately previously. When these selections are completed, the particulars selected are finalized by pressing the selection button 118c in the direction indicated by the arrow display 412. By pressing the OK button 119 as indicated by a finalization display 413, the final chart type is specified and a capture preparation state is attained. Thus, in this embodiment, a chart type is selected and specified from among a plurality of selectable chart types in accordance with an indication made by the user.

Figure 5A:
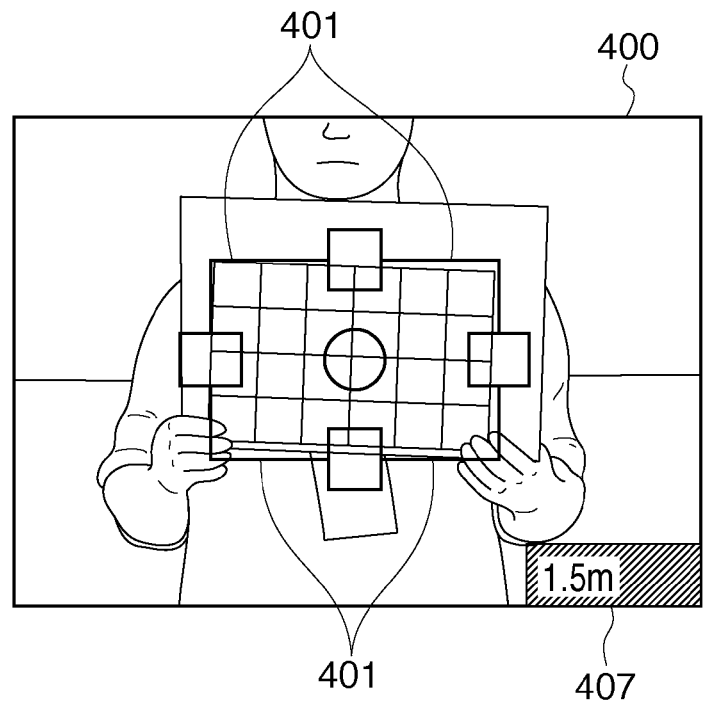
FIG. 5A is a diagram illustrating an example of a viewfinder view when a "Chart 1" is selected in the embodiment.
Figure 5B:
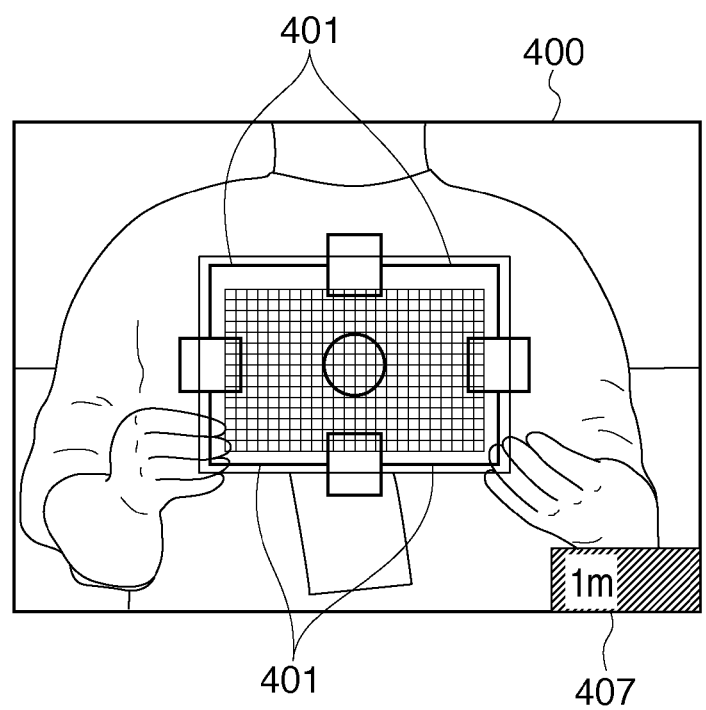
FIG. 5B is a diagram illustrating an example of a viewfinder view when a "Chart 2" is selected in the embodiment.
Figure 5C:
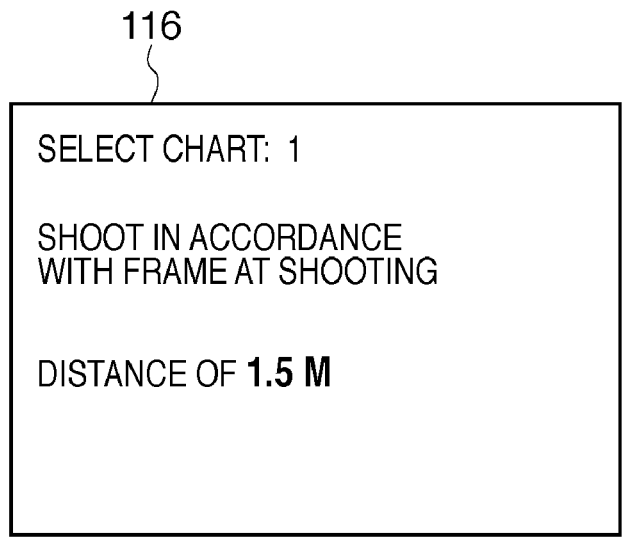
FIG. 5C is a diagram illustrating an example of a display on a display unit when "Chart 1" is selected in the embodiment.
Figure 5D:
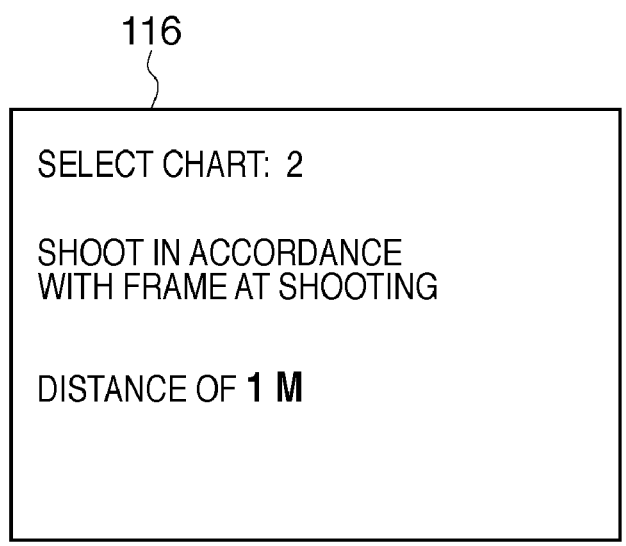
FIG. 5D is a diagram illustrating an example of a display on a display unit when "Chart 2" is selected in the embodiment.

FIG. 5A illustrates an example of a viewfinder view with regard to "Chart 1", and FIG. 5B illustrates an example of a viewfinder view with regard to "Chart 2". "Chart 1" and "Chart 2" differ in terms of size, with "Chart 1" being, for example, 1.5 times the size of "Chart 2". In order to capture these charts at equal sizes, therefore, the ratio of object distances will be 3:2 if the same taking lens is used. In accordance with the focal length of lens unit 200, therefore, the distance displayed in the object distance display section 407 is, e.g., 1.5 m with respect to "Chart 1", as illustrated in FIG. 5A, and, e.g., 1 m with respect to "Chart 2". At this time messages indicated in FIGS. 5C and 5D are displayed in the display section 116 with regard to "Chart 1" and "Chart 2", respectively.

In accordance with the embodiment as illustrated in FIGS. 5A to 5D, an appropriate object distance that is based upon the taking lens is presented to the user in accordance with the chart type selected as the subject in the chart capture mode. The user is capable of deciding the picture taking distance with the presented object distance.

(Chart Capture Processing)

FIG. 6 is a flowchart illustrating capture preparation processing, which is controlled by the camera controller 111, in the chart capture mode. This algorithm is started by setting the mode setting dial 301 to a position other than the power-off position 301a.

First, at step S101, it is determined whether the mode setting dial 301 has been set to the chart capture mode position 301f. The start-up state is maintained if the chart capture mode is not selected. If it is determined that the dial has been set to the chart capture mode position 301f, then the process proceeds to step S102 and the chart selection display (FIG. 4B) is displayed in the display section 116.

Next, at step S103, the camera controller 111 acquires the focal length information of the taking lens (lens unit 200) from the lens controller 206 and calculates the object distances that are appropriate for the two types of charts. It should be noted that a table describing appropriate object distances conforming to the chart type and lens type may be prepared in advance.

At step S104, it is determined whether "Chart 1" has been selected at step S102. If "Chart 1" has been selected, the process proceeds to step S106 and the chart capture frame is displayed on the finder display element 105. Then, at step S107, the object distance appropriate for "Chart 1" calculated at step S103 is displayed in the object distance display section 407 of the finder display element 105 and in the display section 116 of the camera, thereby notifying the user. The process then proceeds to step S110.

On the other hand, if "Chart 1" has not been selected, then it is determined at step S105 whether "Chart 2" has been selected at step S102. If "Chart 2" has been selected, control proceeds to step S108 and the chart capture frame is displayed on the finder display element 105. Then, at step S109, the object distance appropriate for "Chart 2" calculated at step S103 is displayed in the object distance display section 407 of the finder display element 105 and in the display section 116 of the camera, thereby notifying the user. The process then proceeds to step S110.

On the other hand, if "Chart 2" has not been selected, control returns to step S102.

At step S110, a mode for automatic exposure (AE) and autofocus (AF) appropriate for chart capture is set, an image capture preparations stage is attained at step S111 and then this process ends.

The user thus decides the actual shooting position based upon the object distance presented in accordance with the chart type and, by pressing the shutter switch 113, starts the above-described shooting capture sequence.

Thus, in accordance with this embodiment as described above, when chart capture for the purpose of creating a color profile is performed, the chart type to be captured is clearly designated by the user, thereby making it possible to obtain the optimum object distance. Accordingly, it is possible to perform image capture that is always based upon a correct setting of automatic exposure, accurate focus and accurate shooting magnification. Even a user having little experience in chart capture can readily acquire an accurate chart image necessary for creating a color profile. As a result, it is possible to improve the accuracy of a color profile created using information concerning the captured image of a chart.

<Modifications>

In the foregoing embodiment, a digital single-lens reflex camera with an interchangeable lens is described as an example. However, the present invention is not limited to a camera of such type. For example, the camera may be a rangefinder digital camera with an interchangeable lens, a compact-type digital camera with a fixed lens with or without zoom function, or a digital video camera, etc. Further, although a transmissive liquid crystal element has been described as an example of a finder display element, the present invention can be practiced also by a method of displaying the chart frame by using light-emitting diodes to illuminate the viewfinder screen. Furthermore, the present invention can be practiced also by other viewfinder arrangements and display configurations. For example, a viewfinder image, chart frame and chart selection screen can be displayed on an liquid crystal display element or electroluminescent element without the provision of an optical viewfinder.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298590, filed Nov. 16, 2007, which is hereby incorporated by reference herein in its entirety.

What is claimed is:

1. An image capturing apparatus for capturing a chart having color patches of a plurality of colors using a taking lens and obtaining a color-patch signal for creating a color profile, the image capturing apparatus comprising:
   an identification unit configured to identify a type of chart;
   an acquisition unit configured to acquire the current focal length of the taking lens;
   a determination unit configured to determine, based upon the acquired focal length, a preferred object distance from the image capturing apparatus to the chart, wherein the preferred object distance is the distance, corresponding to the identified chart type, at which the chart should be positioned with respect to the image capturing apparatus in order to obtain an image in which the size of the chart within the captured image is suited to create a color profile;
   a viewfinder display unit configured to display (a) a chart capture frame, which serves as a chart position indicator and is located so as to avoid light falloff at the periphery of the taking lens, and (b) an autofocus position indicator, in a viewfinder field; and
   a notification unit configured to give a notification of the object distance.

2. The apparatus according to claim 1, wherein said identification unit selects the chart type from among a plurality of selectable chart types in accordance with an indication from the user.

3. The apparatus according to claim 1, wherein said notification unit displays the object distance superimposed upon a viewfinder.

4. The apparatus according to claim 1, further comprising a mode setting unit configured to set a chart capture mode,
   wherein said identification unit, said acquisition unit, said determination unit, and said notification unit operate in a case where the chart capture mode has been set.

5. An image capturing apparatus according to claim 1, wherein the chart capture frame occupies about one-fourth of an area of the viewfinder area.

6. A method of controlling an image capturing apparatus for capturing a chart having color patches of a plurality of colors using a taking lens and obtaining a color-patch signal for creating a color profile, said method comprising the steps of:

identifying a type of chart;

acquiring the current focal length of the taking lens;

determining, based upon the acquired focal length, a preferred object distance from the image capturing apparatus to the chart, wherein the preferred object distance is the distance, corresponding to the identified chart type, at which the chart should be positioned with respect to the image capturing apparatus in order to obtain an image in which the size of the chart within the captured image is suited to create a color profile;

displaying (a) a chart capture frame, which serves as a chart position indicator and is located so as to avoid light falloff at the periphery of the taking lens, and (b) an autofocus position indicator, in a viewfinder field; and giving a notification of the object distance.

7. A non-transitory storage medium having stored thereon a computer program for controlling an image capturing apparatus for capturing a chart having color patches of a plurality of colors using a taking lens and obtaining a color-patch signal for creating a color profile, said program comprising code for performing the following steps:

identifying a type of chart;

acquiring the current focal length of the taking lens;

determining, based upon the acquired focal length, a preferred object distance from the image capturing apparatus to the chart, wherein the preferred object distance is the distance, corresponding to the identified chart type, at which the chart should be positioned with respect to the image capturing apparatus in order to obtain an image in which the size of the chart within the captured image is suited to create a color profile;

displaying (a) a chart capture frame, which serves as a chart position indicator and is located so as to avoid light falloff at the periphery of the taking lens, and (b) an autofocus position indicator, in a viewfinder field; and giving a notification of the object distance.

\* \* \* \* \*